United States Patent
Fort et al.

(10) Patent No.: US 12,182,847 B2
(45) Date of Patent: Dec. 31, 2024

(54) METHOD AND APPARATUS FOR PROVIDING RECOMMENDATIONS BASED ON RETURN DATA

(71) Applicant: Affirm, Inc., San Francisco, CA (US)

(72) Inventors: Enric Gili Fort, San Francisco, CA (US); Hossein Ghodrati Noushahr, San Francisco, CA (US); Pablo Vargas Ibarra, San Francisco, CA (US); Mark L. Sainz Zaragoza, San Francisco, CA (US); Eduardo Vilar, San Rafael, CA (US)

(73) Assignee: Affirm, Inc., San Francisco, CA (US)

( * ) Notice: Subject to any disclaimer, the term of this patent is extended or adjusted under 35 U.S.C. 154(b) by 163 days.

(21) Appl. No.: 17/684,017

(22) Filed: Mar. 1, 2022

(65) Prior Publication Data
US 2023/0281690 A1    Sep. 7, 2023

(51) Int. Cl.
G06Q 30/00      (2023.01)
G06Q 30/0282    (2023.01)
G06Q 30/0601    (2023.01)

(52) U.S. Cl.
CPC ..... G06Q 30/0631 (2013.01); G06Q 30/0282 (2013.01)

(58) Field of Classification Search
CPC .............. G06Q 30/0631; G06Q 30/0282
USPC ................................ 705/26.1–27.2
See application file for complete search history.

(56) References Cited

U.S. PATENT DOCUMENTS

| | | | |
|---|---|---|---|
| 8,311,895 B1 | 11/2012 | Murugan et al. | |
| 8,751,507 B2 | 6/2014 | Kim et al. | |
| 9,898,772 B1 | 2/2018 | Word | |
| 10,083,476 B2 | 9/2018 | Stoppelman | |
| 11,030,674 B2 | 6/2021 | Nair et al. | |
| 2014/0257927 A1* | 9/2014 | Brock | G06Q 30/016 705/26.7 |
| 2014/0324534 A1 | 10/2014 | Grichnik et al. | |
| 2015/0278911 A1 | 10/2015 | Rink | |
| 2020/0175528 A1 | 6/2020 | Bazari et al. | |
| 2020/0320607 A1 | 10/2020 | Beauchamp | |
| 2021/0012280 A1 | 1/2021 | Paquin et al. | |
| 2021/0166243 A1 | 6/2021 | Kentris et al. | |
| 2021/0216922 A1 | 7/2021 | Deshapande et al. | |

OTHER PUBLICATIONS

J. Chen, C. Miller and G. G. Dagher, "Product recommendation system for small online retailers using association rules mining," Proceedings of the 2014 International Conference on Innovative Design and Manufacturing (ICIDM), Montreal, QC, Canada, 2014, pp. 71-77, doi: 10.1109/IDAM.2014.6912673. (Year: 2014).*

Extended European Search Report for corresponding European Application No. 23156713.2 dated Jun. 19, 2023, all pages cited in its entirety.

* cited by examiner

Primary Examiner — Anand Loharikar
(74) Attorney, Agent, or Firm — Burr & Forman LLP

(57) ABSTRACT

A method of recommending products in association with product returns may include receiving a return request from a customer associated with a returned product and receiving search results based on a search for relevant products to the returned product. The method may further include filtering the search results based on a likelihood of return rating of at least some of the relevant products, and displaying a plurality of recommended products based on the filtering of the search results.

19 Claims, 4 Drawing Sheets

METHOD AND APPARATUS FOR PROVIDING RECOMMENDATIONS BASED ON RETURN DATA

TECHNICAL FIELD

Example embodiments generally relate to financial industry technologies and, in particular, relate to apparatuses, systems, and methods for facilitating commerce by enabling product return data to be analyzed for the provision of recommendations on the basis of the same.

BACKGROUND

The financial industry is comprised of many thousands of customers, vendors, lenders, borrowers, and other bit players that all interact in various ways to enable customers to ultimately have access to goods and services provided by vendors. Credit and debit transactions have long been a way that individuals have managed point of sale transactions to ensure seamless transfer of funds from customers, or on their behalf, to vendors for relatively routine or small transactions. These transactions support individual sales, and help customers obtain products, and vendors sell products, while providing an ample source of data regarding the transactions involved.

That said, at least some of those transactions inevitably result in returned products. The return of products creates an interruption to cash flow for vendors since funds provided to cover a transaction may need to be refunded. If a refund is issued, the customer may not spend the refund at the same vendor, and therefore sales may be lost. Moreover, the return itself imposes a cost for processing on the vendor. As such, vendors often prefer to provide a voucher or credit to the customer, and certain companies have even evolved into a space where return processing is offered as a service to vendors.

The returns as a service space is relatively new, and continues to develop. Along with such development, there is fertile ground for innovative ideas regarding how to improve the efficiency and effectiveness of the service. Example embodiments explore technical means by which to improve efficiency and effectiveness in relation to some specific aspects of this space.

BRIEF SUMMARY OF SOME EXAMPLES

Accordingly, some example embodiments may enable the provision of technical means by which to provide recommendations to customers based on product return data. This can be a vital tool for driving commerce directly connected to product returns, and is also only possible with technical assistance.

In an example embodiment, a method of recommending products in association with product returns may be provided. The method may include receiving a return request from a customer associated with a returned product and receiving search results based on a search for relevant products to the returned product. The method may further include filtering the search results based on a likelihood of return rating of at least some of the relevant products, and displaying a plurality of recommended products based on the filtering of the search results.

In another example embodiment, an apparatus for recommending products in association with product returns may be provided. The apparatus may include processing circuitry configured for receiving a return request from a customer associated with a returned product and receiving search results based on a search for relevant products to the returned product. The processing circuitry may further be configured for filtering the search results based on a likelihood of return rating of at least some of the relevant products, and displaying a plurality of recommended products based on the filtering of the search results.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
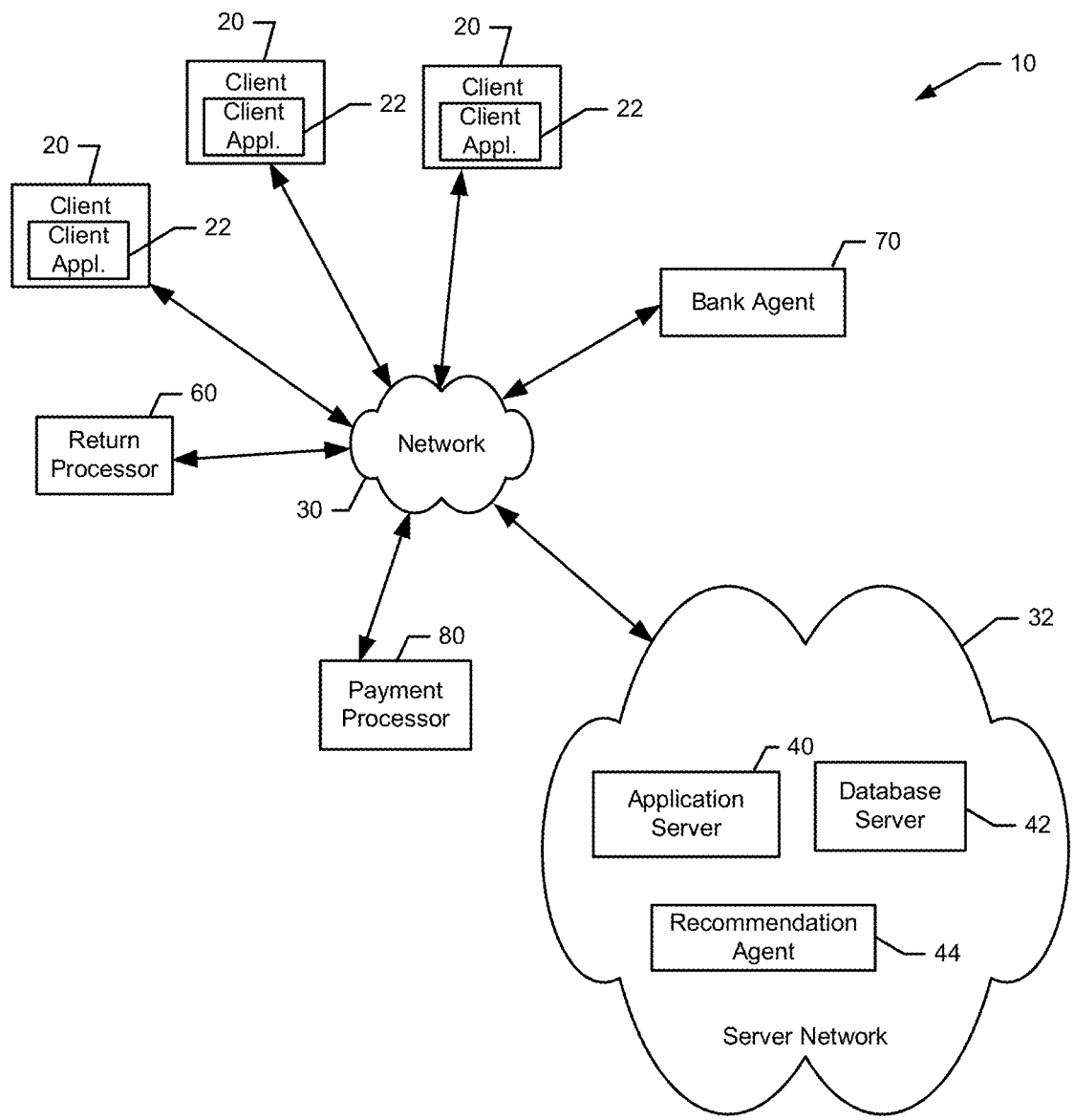
FIG. 1 illustrates a functional block diagram of a system for recommending products in association with product returns according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Additionally, when the term "data" is used, it should be appreciated that the data may in some cases include simply data or a particular type of data generated based on operation of algorithms and computational services, or, in some cases, the data may actually provide computations, results, algorithms and/or the like that are provided as services.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon.

The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide for a data processing platform that can be instantiated at an apparatus comprising configurable processing circuitry. The processing circuitry may be configured to execute various processing functions on financial data using the techniques described herein. The data processing platform may, for example, be configured to provide an information exchange via which multiple independent or even proprietary platforms may be connected to each other. In particular, the data platform may monitor various types of signals (i.e., data inputs) that are indicative of different activities, particularly associated with the return of merchandise by customers to the vendors or merchants from which the merchandise was originally purchased. On the basis of the various signals that are monitored, determinations may be made regarding how likely certain products are to be returned. The likelihood of return may be used as a basis for filtering product search results or modifying the presentation of recommended products to the customer.

When used specifically in the context of product return processing, a customer that is initiating a product return may have recommendations provided to the customer regarding potential products the customer may be interested in based both on the product being returned, and on the likelihood of return of all possible replacement products that may otherwise have been presented as being similar to the returned product. In this regard, a typical system would be expected only to determine similar products to the returned product, and may present similar products to the customer without regard to the likelihood that those similar products may also be returned. By filtering results that are initially only based on similarity using a further consideration of the likelihood of return of the products, merchants may have increased likelihood of completing a sale with a fully satisfied customer. Moreover, to the extent the return likelihood information that drives the filtering and presentation scheme is further communicated to the customer in some way (which may optionally be done), the customer may be induced to make purchases of products inspired by confidence that it is unlikely that they themselves will have to return that product as well. As such, the data processing platform may be embodied as a behavioral engine that can also recommend products to customers with at least part of the basis for such recommendation being a likelihood of product return.

Example embodiments may be practiced in the context of a larger return processing platform that connects customers and merchants (or vendors) to banks, payment services, and a transaction return processor within the financial industry. By enabling data between the players on or members of the platform to be shared, and by further providing vendors with tools for using the platform to strategically market products to customers processing returns, the vendors may be enabled to improve sales while simultaneously also improving customer satisfaction. Thus, vendors may have increased flexibility for marketing their products, and may also be able to see where improvements can be made in their own product line, while still maximizing their ability to provide customers continued access to goods and services they desire or need at any given time. Moreover, the platform may be employed under the management of the return processor to control the usage of data on mutually agreeable terms for all participants who access the platform, and to handle some of the financial aspects of the return process. Accordingly, a commercial framework can be provided by a technical platform designed to connect vendors with access to financial support to manage returns while driving future sales, and even further facilitate growth. In other words, instead of merely initiating a platform for supporting money transfers for individual transactions, example embodiments provide vendors with technical means by which to manage returns in a way that maximizes customer satisfaction, may improve repurchase volume, and also provide useful information on past transactions involving returns. This stands in contrast to today's paradigm in which vendors may simply issue refunds without having much ability to induce the customer to complete another final and satisfying transaction with the vendor. The creation of one platform, managed by the return processor, for the interaction of multiple parties to enable vendors and customers to mutually benefit from a return process that incorporates intelligence directed to effectively processing a return while minimizing a likelihood of future returns based on return likelihood provides a flexible and yet cohesive experience for vendors and customers that maximizes responsible access to financial freedom and satisfaction.

Example embodiments therefore do not relate to the legal responsibilities associated with establishing a loan or a lending relationship. Moreover, example embodiments do not merely relate to the calculation of risk used to determine whether to grant a loan to a vendor. Instead, example embodiments relate to a technical means by which to determine a likelihood of product returns associated with product recommendations that would otherwise simply be made based on product similarity to a returned product. Example embodiments may, in some cases, further facilitate the transfer of funds to the vendor, and manage the return activity and repayment aspects that complete the full scope of the transactions involved.

Example embodiments not only provide the return processing platform, but also provide various enabling technologies that may facilitate operation of the return processing platform itself or of modules that may interact with the return processing platform. Example embodiments may also provide for enhancement of functionalities associated with the environment that is created by the return processing platform. The return processing platform may provide a mechanism by which to enhance commerce in a responsible way that is empowering to both vendors and customers.

An example embodiment of the invention will now be described in reference to FIG. 1, which illustrates an example system in which an embodiment of the present invention may be employed. As shown in FIG. 1, a system comprising a return processing platform 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The clients 20 may, in some cases, each be associated with a single individual or vendor. However, in some embodiments, one or more of the clients 20 may be associated with an organization (e.g., a company) or group of individuals (e.g., a business unit). In general, the clients 20 may be referred to as members of the environment or community associated with the return processing platform 10.

Each one of the clients 20 may include one or more instances of a communication device such as, for example, a computing device (e.g., a computer, a server, a network access terminal, a personal digital assistant (PDA), radio equipment, cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, the clients 20 may include or be capable of executing a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30 as described herein. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for sharing, processing and/or utilizing financial data as described in greater detail below.

The network 30 may be a data network, such as one or more instances of a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to the return processing platform 10, and more particularly relating to coordinating provision of recommended content to one or more of the clients 20 based on return processing activities as described herein. For example, the application server 40 may be configured to provide for storage of information descriptive of events or activities associated with the return processing platform 10 and the execution of a determination of group of products to recommend, market or feature to the customer (e.g., at one of the clients 20) while the customer is otherwise in the process of conducting a product return associated with a previously purchased product of the customer from a particular vendor or merchant. In some cases, data and/or services may be exchanged amongst members, where specific needs or desires of the members are aligned with respect to playing their respective roles in connection with conducting financial transactions, and enabling the volume and/or specific products associated with returns or a particular vendor and/or customer serve as a basis for determining which products to recommend to the customer.

In some embodiments, for example, the application server 40 may therefore include an instance of a recommendation agent 44 comprising stored instructions for handling activities associated with practicing example embodiments as described herein. The recommendation agent 44 may be a technical device, component or module affiliated with the return processor for the functioning of the return processing platform 10. Thus, the recommendation agent 44 may operate under control of the return processor to be a technical means by which to carry out activities under direction of the return processor or employees thereof. As such, in some embodiments, the clients 20 may access the return processing platform 10 services, and more particularly contact the recommendation agent 44 online and utilize the services provided thereby. However, it should be appreciated that in other embodiments, an application (e.g., the client application 22) enabling the clients 20 to interact with the recommendation agent 44 (or components thereof) may be provided from the application server 40 (e.g., via download over the network 30) to one or more of the clients 20 to enable recipient clients to instantiate an instance of the client application 22 for local operation such that the recommendation agent 44 may be a distributor of software enabling members or parties to participate in operation of the return processing platform 10. Alternatively, another distributor of the software may provide the client 20 with the client application 22, and the recommendation agent 44 may communicate with the client 20 (via the client application 22) after such download.

In an example embodiment, the client application 22 may therefore include application programming interfaces (APIs) and other web interfaces to enable the client 20 to conduct business via the return processing platform 10. The client application 22 may include a series of control consoles or web pages including a landing page, onboarding services, activity feed, account settings (e.g., vendor profile information, customer profile information, etc.), transaction management services, payment management services and the like in cooperation with a service application that may be executed at the recommendation agent 44. Thus, for example, the client application 22 may enable the vendor and/or customer to submit profile information, request and process product returns, obtain financing for purchases (e.g., buy now, pay later financing) review monthly statements, access or adjust information associated with the vendor or customer account, or receive help or other information. Budgeting tools and other useful information and other useful tools for managing the finances of the vendor or customer may also be available via the client application 22 in some cases.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the recommendation agent 44 configured to operate in accordance with an example embodiment of the present invention. In this regard, for example, the recommendation agent 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which individual operators or managers of the entity associated with the recommendation agent 44 may interact with, configure or otherwise maintain the return processing platform 10 and/or the recommendation agent 44.

As such, the environment of FIG. 1 illustrates an example in which provision of content and information associated with the financial industry (e.g., including at least some data provided to/from customers and/or vendors in real-time) may be accomplished by a particular entity (namely the recommendation agent 44 residing at the application server 40). Thus, the recommendation agent 44 may be configured to handle provision of content and information associated with tasks that are associated only with the return processing platform 10. Access to the recommendation agent 44 may therefore be secured as appropriate for the individuals or organizations involved and credentials of individuals or organizations attempting to utilize the tools provided herein may be managed by digital rights management services or other authentication and security services or protocols that are outside the scope of this disclosure.

In some cases, the recommendation agent 44 may be utilized to provide product recommendations in association with return processing, where such recommendations may be interacted with by the customer to direct return or refund credit toward the purchase of one or more of the recommended products. However, some embodiments may also integrate other return processing activities, and even management of all or some aspects of the financing associated with purchasing and/or returning products. The return processing platform 10 may therefore include or communicate with other actors, entities or organizations to support various ways of transferring money or credit, and FIG. 1 reflects some of those actors, entities or organizations. In this regard, some embodiments may integrate credit granting entities that may extend credit to customers for an initial purchase of a product and/or for the value of returned merchandise. However, it should be noted that the recommendation agent 44 may also work independent of any credit extension or monetary transactions in some cases. In cases where some form of credit extension is integrated into the system, the return processing platform 10 may also operate in cooperation with a bank agent 50, a return processor 60, and a payment processor 80. The recommendation agent 44 may be configured to interact with, or otherwise facilitate interactions between, each of the bank agent 50, the return processor 60, and the payment processor 80 in order to carry out example embodiments as described herein. Thus, each of the bank agent 50, the return processor 60, and the payment processor 80 should be understood to be a computer, server, smart phone, or other technical component or module associated with a respective party (e.g., an lending bank, return processor, and a payment service, respectively) that is capable of communication with other parties via the network 30, and under control of or responsive to facilitating communication by the recommendation agent 44.

The bank may be a financial services provider or lending institution that may extend credit to the customer either for the value of an initial product purchase (if the initial product purchase is conducted via financing), and/or for the value of a returned product. The bank may have a persistent relationship with the entity associated with the recommendation agent 44 (e.g., the return processor), but generally need not have any persistent or pre-existing relationship with the vendor or (in some cases) the customer. The bank may be contracted with or otherwise have a pre-existing relationship with the recommendation agent 44 (and entity associated therewith) that enables the recommendation agent 44 to facilitate transactions on behalf of the vendor or customer when certain conditions (agreed upon in advance by the entity associated with the recommendation agent 44 and the issuing bank) are met associated with a transaction undertaken (or attempted) by the vendor or customer via the client 20 and client application 22. For example, the bank may be the issuer of a loan or credit extension on behalf of the recommendation agent 44 (or another party associated with the return processor) and be responsible for directly paying the merchants and vendors the amount of money that is approved for extension of credit for one of the clients 20 (e.g., a customer).

The payment processor 80 may be an agent or service that facilitates the acceptance and/or sending of payments between parties online. Thus, for example, the payment processor 80 may utilize its own software, application programming interfaces (APIs) or the like that define an infrastructure or payment platform to connect businesses or companies to manage their businesses or transactions online.

As noted above, the return processing platform 10 may operate to enable the customer[1] associated with a given one of the clients 20 to receive a financial credit from the recommendation agent 44 based on the return value of a returned product. In some example embodiments, the client application 22 may be used in connection with setting up the account details that are then used as the basis for managing interactions between the parties shown in FIG. 1 in association with the return processor 60. In this regard, for example, the client application 22 may be used to engage (e.g., via a website and corresponding APIs) with the recommendation agent 44 to set up an account with the return processor 60 for services associated with the return processing platform 10. The return processor 60 may prompt the client 20 to provide account details associated with the bank agent 70 and may provide terms and conditions (electronically or via mail or other communication means) that the customer may accept to establish a customer profile and customer account with the return processor 60. Thus, it should be appreciated that the client application 22 could be used to set up the customer account and customer profile and/or to conduct individual transactions (i.e., individual requests for processing a product return).

During establishment of the customer account, the customer may provide an identification of the customer bank, and may also provide details for the savings or checking account that the customer maintains at the customer bank. The customer may also authorize the return processor 60 to make real time (or anytime) checks on account status (e.g., account balance) or to make periodic routine checks of the same. Thus, for example, for each transaction, the return processor 60 may be enabled to check the account balance of the customer. Alternatively or additionally, the return processor 60 may make routine checks or snapshot looks at the account balance. For example, a check may be made every day at a certain time, every two or three days, or at other standard or random intervals. The account status of the customer bank may be used by the return processor 60 in facilitating payment transactions, as described in greater detail below.

In some embodiments, however, the customer account need not be linked to the customer bank or any account other than the customer account with the return processing platform 10. In this regard, as will be noted in greater detail below, since the customer may return products either for the same item (e.g., in a different size or color) or to receive a credit that can be used to shop for something entirely new, there is no requirement for any linking to a bank or external account. To the extent a return for the same product or a return for instant credit is used, no further exchange of funds involving the customer may be necessary. In some cases, this means that the customer may instantly shop again and the merchant may preserve the initial sale (albeit with a substitute product). To support this paradigm in which the customer can immediately shop again to spend the instant credit, the return processor 60 (or a partner organization thereof) may transfer funds to cover the cost of the repurchased item to the merchant or vendor, and then settle the transaction with the merchant or vendor when the product is physically returned. This effectively transfers the risk of the returned product becoming lost or damaged during return to the return processor 60, and may be of significant value to the merchant or vendor in preserving sales. In such an example, the network 30 may have an account (similar to the customer account described above), which may include a link to the merchant bank (and accounts associated therewith) instead of the customer bank described above. Any transfers of funds may therefore be undertaken with the merchant bank.

Even through, as noted above, this paradigm may prevent any need for the customer to transfer additional funds while they enjoy the opportunity to spend the instant credit received, funds may need to be exchanged with the customer if the repurchased product (i.e., the product purchased in replacement of the originally purchased product) does not match the price of the originally purchased product. In such cases, if the repurchased product is more expensive than the originally purchased product, the customer may provide the difference either through authorizing a debit from a bank account that is linked to the customer account, or via a credit card, debit card, financing option, etc. If the repurchased product is cheaper than the originally purchased product, the customer may receive the difference in the form of a credit that can be spent later (e.g., a voucher), or via a refund through the original form of payment, or a transfer of funds to a bank account that is linked to the customer account, for example. Settlement as between the return processor 60 and the merchant or vendor may occur at the time of repurchase (e.g., for any fees that are charged for services) and/or at the time when the returned product is physically received (e.g., when the merchant may typically pay the return processor 60 for the value of the returned product). However, other payment arrangements may also be supported in some alternative embodiments. Regardless of how the payment arrangements are structured, example embodiments may further enhance the ability of the customer to utilize the instant credit described above by receiving strategically identified product recommendations that may enhance the shopping experience and drive repurchase activity.

In an example embodiment, the return processor 60 may be used to grant instant credit to the customer upon commencement of a return process, or at a particular point during the processing of a returned product. The return processor 60 may therefore include APIs and interfaces associated with management of the return process including identification of the customer (and customer account or bank), identification of the product being returned (i.e., the returned product), and any other transaction details that may enable the identity of the returned product, customer, vendor, or the like to be unambiguously identified. When the granting of credit occurs, the return processor 60 may, e.g., at the customer's request, transfer funds from the bank agent 70 to the customer bank in the amount of a credit issued to the customer for the returned product. However, no funds need necessarily be transferred (or at least a different amount may be transferred in either direction) if the customer spends the return credit immediately. To drive repurchase sales, and forgo complexities and communications associated with issuing a credit, voucher or refund, it is therefore highly desirable to incent the user to make repurchases instead of simply returning the product. The recommendation agent 44 may provide product recommendations that are aimed at driving repurchases.

Regardless of how the transactions are initiated, the return processing platform 10 of FIG. 1 may be used before, during and after the time of the transaction in order to enable the return processor 60 to set up the customer account, make determinations necessary to initiate the transactions (i.e., loans and/or returned product credits) responsive to requests for the same, or at periodic intervals, and coordinate settlement of funds associated with the return and repurchase activities that form the basis of transactions at the appropriate time. The recommendation agent 44, which may be collocated with the return processor 60 in some cases, and which may operate under control of the same entity may interact with the customer during the normal activity of the return processor 60 associated with processing a returned product in the manner described in greater detail below. Thus, in some cases, the return processor 60 may also be hosted at the server network 32, and/or may be located at the application server 40. Each of the activities managed by the return processor 60 and/or recommendation agent 44 may have its own respective timing and communications that are facilitated by the return processor 60 and/or recommendation agent 44. Prior to examining any specific example scenario, the structures associated with an apparatus at which the recommendation agent 44 of an example embodiment may be instantiated will be described in reference to FIG. 2.

Figure 2:
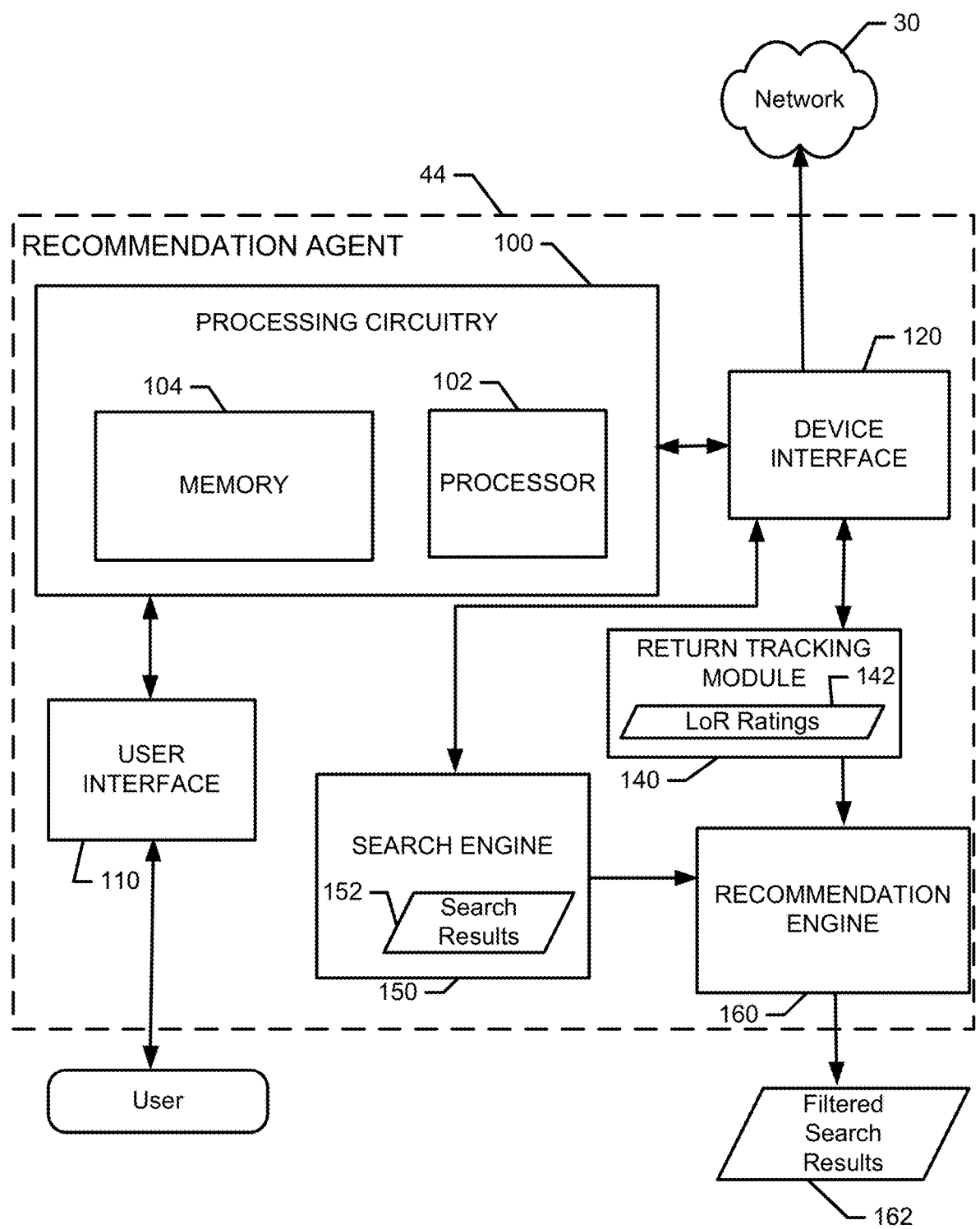
FIG. 2 illustrates a functional block diagram of an apparatus for defining a recommendation agent according to an example embodiment.

FIG. 2 shows certain elements of an apparatus for provision of the recommendation agent 44 or other processing circuitry according to an example embodiment. The apparatus of FIG. 2 may be employed, for example, as the recommendation agent 44 itself operating at, for example, a network device, server, proxy, or the like (e.g., the application server 40 of FIG. 1)). Alternatively, embodiments may be employed on a combination of devices (e.g., in distributed fashion on a device (e.g., a computer) or a variety of other devices/computers that are networked together). Accordingly, some embodiments of the present invention may be embodied wholly at a single device (e.g., the application server 40) or by devices in a client/server relationship (e.g., the application server 40 and one or more clients 20). Thus, although FIG. 2 illustrates the recommendation agent 44 as including the components shown, it should be appreciated that some of the components may be distributed and not centrally located in some cases. Furthermore, it should be noted that the devices or elements described below may not be mandatory and thus some may be omitted or replaced with others in certain embodiments.

Referring now to FIG. 2, an apparatus for provision of tools, services and/or the like for facilitating an exchange for information and services associated therewith in the financial industry is provided. The apparatus may be an embodiment of the recommendation agent 44 or a device of the return processing platform hosting the recommendation agent 44. As such, configuration of the apparatus as described herein may transform the apparatus into the recommendation agent 44. In an example embodiment, the apparatus may include or otherwise be in communication with processing circuitry 100 that is configured to perform data processing, application execution and other processing and management services according to an example embodiment of the present invention. In one embodiment, the processing circuitry 100 may include a storage device (e.g., memory 104) and a processor 102 that may be in communication with or otherwise control a user interface 110 and a device interface 120. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of a server, computer, laptop, workstation or even one of various mobile computing devices. In situations where the processing circuitry 100 is embodied as a server or at a remotely located computing device, the user interface 110 may be disposed at another device (e.g., at a computer terminal) that may be in communication with the processing circuitry 110 via the device interface 120 and/or a network (e.g., network 30).

The user interface 110 may be in communication with the processing circuitry 100 to receive an indication of a user input at the user interface 110 and/or to provide an audible, visual, mechanical or other output to the user. As such, the user interface 110 may include, for example, a keyboard, a mouse, a joystick, a display, a touch screen, a microphone, a speaker, augmented/virtual reality device, or other input/output mechanisms. In embodiments where the apparatus is embodied at a server or other network entity, the user interface 110 may be limited or even eliminated in some cases. Alternatively, as indicated above, the user interface 110 may be remotely located.

The device interface 120 may include one or more interface mechanisms for enabling communication with other devices and/or networks. In some cases, the device interface 120 may be any means such as a device or circuitry embodied in either hardware, software, or a combination of hardware and software that is configured to receive and/or transmit data from/to a network (e.g., network 30) and/or any other device or module in communication with the processing circuitry 100. In this regard, the device interface 120 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 120 communicates with a network, the network 30 may be any of various examples of wireless or wired communication networks such as, for example, data networks like a Local Area Network (LAN), a Metropolitan Area Network (MAN), and/or a Wide Area Network (WAN), such as the Internet, as described above.

In an example embodiment, the memory 104 may include one or more non-transitory storage or memory devices such as, for example, volatile and/or non-volatile memory that may be either fixed or removable. The memory 104 may be configured to store information, data, applications, instructions or the like for enabling the apparatus to carry out various functions in accordance with example embodiments of the present invention. For example, the memory 104 could be configured to buffer input data for processing by the processor 102. Additionally or alternatively, the memory 104 could be configured to store instructions for execution by the processor 102. As yet another alternative, the memory 104 may include one of a plurality of databases (e.g., database server 42) that may store a variety of files, contents or data sets. Among the contents of the memory 104, applications (e.g., a service application configured to interface with the client application 22) may be stored for execution by the processor 102 in order to carry out the functionality associated with each respective application.

The processor 102 may be embodied in a number of different ways. For example, the processor 102 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 102 may be configured to execute instructions stored in the memory 104 or otherwise accessible to the processor 102. As such, whether configured by hardware or software methods, or by a combination thereof, the processor 102 may represent an entity (e.g., physically embodied in circuitry) capable of performing operations according to embodiments of the present invention while configured accordingly. Thus, for example, when the processor 102 is embodied as an ASIC, FPGA or the like, the processor 102 may be specifically configured hardware for conducting the operations described herein. Alternatively, as another example, when the processor 102 is embodied as an executor of software instructions, the instructions may specifically configure the processor 102 to perform the operations described herein.

In an example embodiment, the processor 102 (or the processing circuitry 100) may be embodied as, include or otherwise control the recommendation agent 44, which may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the recommendation agent 44 as described below.

The return processor 60, if integrated with the recommendation agent 44, may include the same or different physical components to the processing circuitry 100 described above. In such cases, the recommendation agent 44 (e.g., via the return processor 60) may be configured to include tools to facilitate the creation of customer accounts (and a corresponding customer profile), and the coordination of communication and fund transfers to support the operations of the return processing platform 10 as described herein. The tools may be provided in the form of various modules that may be instantiated by configuration of the processing circuitry 100. FIG. 2 illustrates some examples of modules that may be included in the recommendation agent 44 and that may be individually configured to perform one or more of the individual tasks or functions generally attributable to the recommendation agent 44 according to an example embodiment. However, the recommendation agent 44 need not necessarily be modular. In cases where the recommendation agent 44 employs modules, the modules may, for example, be configured to perform the tasks and functions described herein. In some embodiments, the recommendation agent 44 and/or any modules comprising the recommendation agent 44 may be any means such as a device or circuitry operating in accordance with software or otherwise embodied in hardware or a combination of hardware and software (e.g., processor 102 operating under software control, the processor 102 embodied as an ASIC or FPGA specifically configured to perform the operations described herein, or a combination thereof) thereby configuring the device or circuitry to perform the corresponding functions of the recommendation agent 44 and/or any modules thereof, as described herein.

The return processor 60 may provide interfaces for the customer to log in to the customer account, or create one, and initiate a product return. In this regard, the return processor 60 may be configured to enable the customer to identify the product being returned (i.e., identify the returned product). In some cases, the identification of the returned product may be done via reference to a prior online transaction or in-store transaction. A sales receipt or other code associated with the returned product and/or the transaction may, in some cases, be used to initiate the return. The physical return of the product itself may be arranged either in-store or via mail.

In an example embodiment, once the returned product has been identified, an instant credit may be applied to the customer account, and may be available for the customer to spend, for example, on other products that are available via the merchant that sold the returned product. The recommendation engine 44 may provide images of recommended products to the customer as described herein. The provision of the recommended products may cause a repurchase to be undertaken, which may be mutually beneficial to all parties.

As shown in FIG. 2, the recommendation agent 44 may include a return tracking module 140, a search engine 150 and a recommendation engine 160. The return tracking module 140 may be configured to track return volume for a given merchant and in some cases also repurchase volume for the given merchant. The return tracking module 140 may also be configured to monitor the identity of products and return patterns of each individual customer associated with a corresponding customer account as described in greater detail below. In this regard, for example, the return tracking module 140 may be configured to receive product return data associated with specific merchants and customers that may be useful for determining what products are returned for each merchant, and the relative frequency of such returns. In some cases, product repurchase volume may also be tracked, and thereby associations may be made between products returned, and corresponding products that are repurchased with some level of frequency after those particular products are returned (when such associations exist). Thus, the data processed by the return tracking module 140 may include data indicative of customer/vendor purchase transactions, and the data may be aggregated for each vendor and each customer. In some cases, vendor data or customer data for different vendors or customers that can be associated with each other may also be aggregated. The associations may be based on industry affinity ratings (e.g., for vendors that sell similar products) or behavior affinity ratings (e.g., for customers with similar product return patterns or behaviors). In some example embodiments, the data may include signals descriptive of transaction details including product count (e.g., for initial sales of a particular merchant or piece of merchandise), product dollar value (e.g., original sales price), return count, return dollar value (e.g., return credit or voucher value), repurchase count, etc.

The return tracking module 140 may receive (e.g., via the network 30) any or all of the data noted above, and may analyze such data as a function of time. In an example embodiment, the return tracking module 140 may employ analysis techniques to receive return data relating to product returns for a plurality of products. Based on the return data, the return tracking module 140 may determine a return frequency dataset including likelihood of return ratings 142 for all of the products for which data is received. The likelihood of return (LoR) ratings 142 may be determined based on comparing sales volume to return volume for each of the products (e.g., to determine what fraction or percentage of every product sale results in a product return). In an example embodiment, a return model that has been crafted previously and is used to guide the processing of the inputs received in the return tracking module 140 to generate a corresponding likelihood or return rating output for products for which data is received to create the return frequency dataset. However, in some cases, the return tracking module 140 may actually actively train, update or design the model either periodically or in real time, based on analysis of the data relative to the continued performance of the return tracking module 140 and feedback received from operators of designers of the return tracking module 140.

In an example embodiment, the forecasting module 140 may utilize input parameters defining merchant attributes (which may be determined from merchant profile information) along with the transaction details (e.g., order count or dollar value, return count or dollar value, repurchase count or dollar value, etc.) at the corresponding sampling frequency defined by the model in use for the entities desired.

The model may then process the input parameters or input data to generate the likelihood of return ratings 142 for the products tracked on a merchant by merchant (and in some cases customer by customer) basis.

The search engine 150 may be configured to utilize a conventional search tools and/or other information for correlating products (e.g., repurchase information) to determine similar (or otherwise related) products to a returned product. In some cases, the search engine 150 may be configured to rate other products relative to how similar or how related the other products may be to the returned product. Thus, for example, the search engine 150 may aim to identify products with a similarity rating or relevancy rating (or score) that indicates a potential for suitability as an enticement for repurchase as a replacement for the returned product. The higher the similarity rating or relevancy rating another product may have, the higher the chance (at least in general terms) that a generic user may utilize return credit or a voucher to repurchase the other product. Search results 152 may, for example, be ranked based on having the highest similarity or relevancy rating. However, as noted above, the similarity or relevancy rating is only aimed at addressing a generic situation or scenario. With additional information that is discernable from the likelihood of return ratings 142, example embodiments may improve upon that generic situation.

In an example embodiment, the recommendation engine 160 may be configured to determine, based on the search results 152 provided by the search engine 150, and the likelihood of return ratings 142, a modification to the ordering otherwise provided only based on relevancy or similarity by the search engine 150. The modification may be simply be a reordering of the search results 152 (e.g., based on an updated scoring that incorporates the likelihood of return ratings 142) in some cases. However, in other cases, the modification may include the removal of some of the search results 152 based on the likelihood of return ratings 142 and/or other factors. The other factors may include associations or exclusions applied by the merchant, behavioral factors related to the specific customer, and/or the like.

Associations or exclusions applied by the merchant may include tags or other means by which the merchant can indicate that certain products are well suited to be substitutes for each other or poorly suited to be substitutes for each other (e.g., thereby enhancing or diminishing a relevancy score). Thus, the tags may be either positive or negative in terms of permitting a tagged search result to pass the filtering operation, or modifying a relevancy score. Meanwhile, the behavioral factors may include knowledge of past customer behavior. The past customer behavior may relate to specific customer behaviors (e.g., relative to a specific product) or general customer behavior (e.g., based on a classification or characterization of the customer that may be recorded in the customer profile). For example, if a customer previously returned a particular product, the product that was previously returned may be tagged for exclusion from any filtered search results 162. As another example, if a customer does a lot of product returns, the customer may have a high individual risk rating that may cause moving a threshold for the filtering operation so that only the most unlikely to be returned products are presented to such a selective customer. Meanwhile, if the customer has a low individual risk rating since the customer rarely returns products, then the threshold for filtering may be lowered since it is less likely that any repurchased product will also be returned. In any case, after the search results 152 have been modified by the recommendation engine 160, the recommendation engine 160 generates filtered search results 162, which may then be displayed (e.g., at the client 20). As such, the recommendation engine 160 may perform filtering of the search results 152 provided by the search engine 160 on the basis of a likelihood that the potential repurchase products that are recommended may themselves be returned.

The recommendation engine 160 may be configured to remove some of the search results to create the filtered search results based on modifying the relevancy or similarity score provided by the search engine 150. For example, if a particular product is returned at a relatively high rate, either on its own, or as a replacement for another product, the relevancy or similarity score generated by the search engine 150 may be reduced by the recommendation engine 160. In some cases, only results having a final modified score above a minimum threshold may be displayed or included in the filtered search results 162. Thus, some of the search results may effectively be prevented from being displayed as part of the filtering. Furthermore, in some cases, if the particular customer can be seen to have previously returned any one of the search results, then that previously returned product may also be removed from the search results 152 and will not be displayed. The merchant may also tag items for exclusion from display either at all, or in combination or as a substitute to specific other products. In other words, certain combinations of products may be encouraged or discouraged (e.g., due to known compatibility or incompatibility, among other prioritization paradigms). The result is a list of recommended products that not only has relevancy or similarity to the product being returned, but is also more likely to not be returned, and therefore more likely to be a satisfying acquisition for the customer. Example embodiments therefore provide a technical means by which to reduce future returns and the overhead associated with processing the same, and to drive sales and customer satisfaction.

Figure 3:
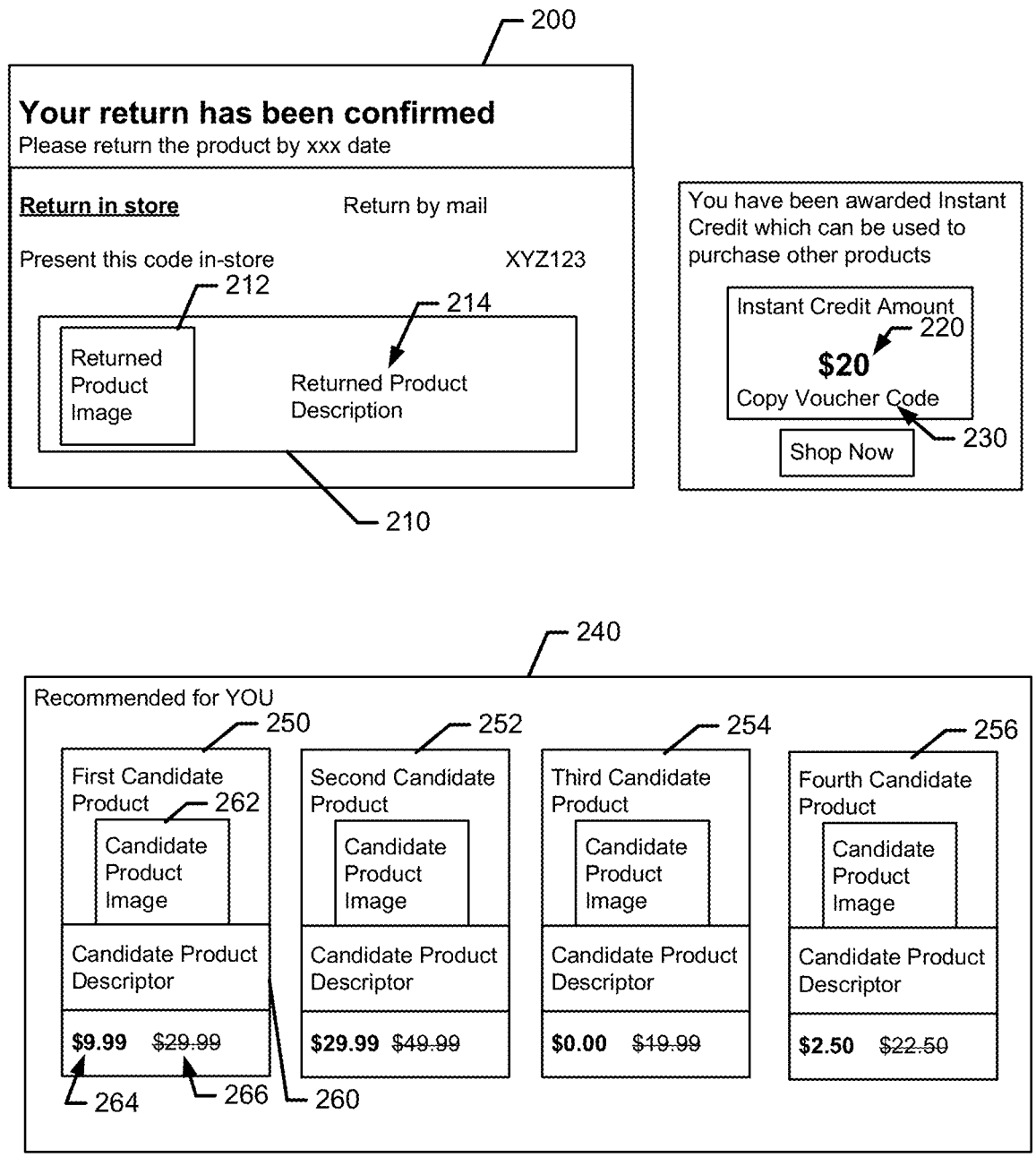
FIG. 3 illustrates a block diagram showing an interface screen associated with product return and repurchase candidate recommendation in accordance with an example embodiment.

FIG. 3 illustrates a sample interface page that may be employed in connection with operation of the recommendation agent 44 (and the return processor 60) in accordance with an example embodiment. In this regard, FIG. 3 shows a return console 200, which may be used to initiate a product return as described above. The return console 200 identifies a returned product 210 (e.g., via returned product image 212 and returned product description 214). The return console 200 also confirms the methodology of the return (e.g., in-store or by mail), and any other information needed to complete the return process.

Once the return is confirmed, an instant credit 220 may be awarded based on the price of the returned product 210. The instant credit 220 may be used to immediately shop for other products (e.g., via the full catalog of products of the merchant, or via the recommended products generated by the recommendation agent 44). However, if the customer prefers to wait to spend the instant credit 220, the customer may request a voucher 230 that can be used at a later time or date.

In an example embodiment, the filtered search results 162 described in connection with FIG. 2 may be presented in a recommended product window 240 (or area). The recommended product window 240 may include a plurality of individual product recommendations including (in this example) a first candidate product 250, a second candidate product 252, a third candidate product 254, and a fourth candidate product 256. Each of the candidate products may include a corresponding one of a candidate product descriptor 260, an image of the candidate product 262, and a modified price 264. The modified price 264 may reflect the application of the instant credit that is available to the customer. Thus, for example, the modified price 264 may be the original price 266 of each individual product recommendation minus the instant credit. In cases where the instant credit 220 is greater than the original price, the modified price may be $0. A reduction in the instant credit amount (i.e., by the amount of the original price) may also be displayed to indicate that more products may be purchased using the instant credit.

In some embodiments, the candidates displayed in the recommended product window 240 may be a displayed subset of an overall list of recommended products. The subset may be limited due to the physical limitations on screen size, and the ability to read and interact with the contents in the recommended product window 240. Thus, for example, the subset may merely be a portion of the overall list, and the customer may cycle through the overall list. In some embodiments, the overall list may be a carousel of candidates, and the customer may cycle through the overall list to change the specific candidates that are in the recommended product window 240 at any given time.

Figure 4:
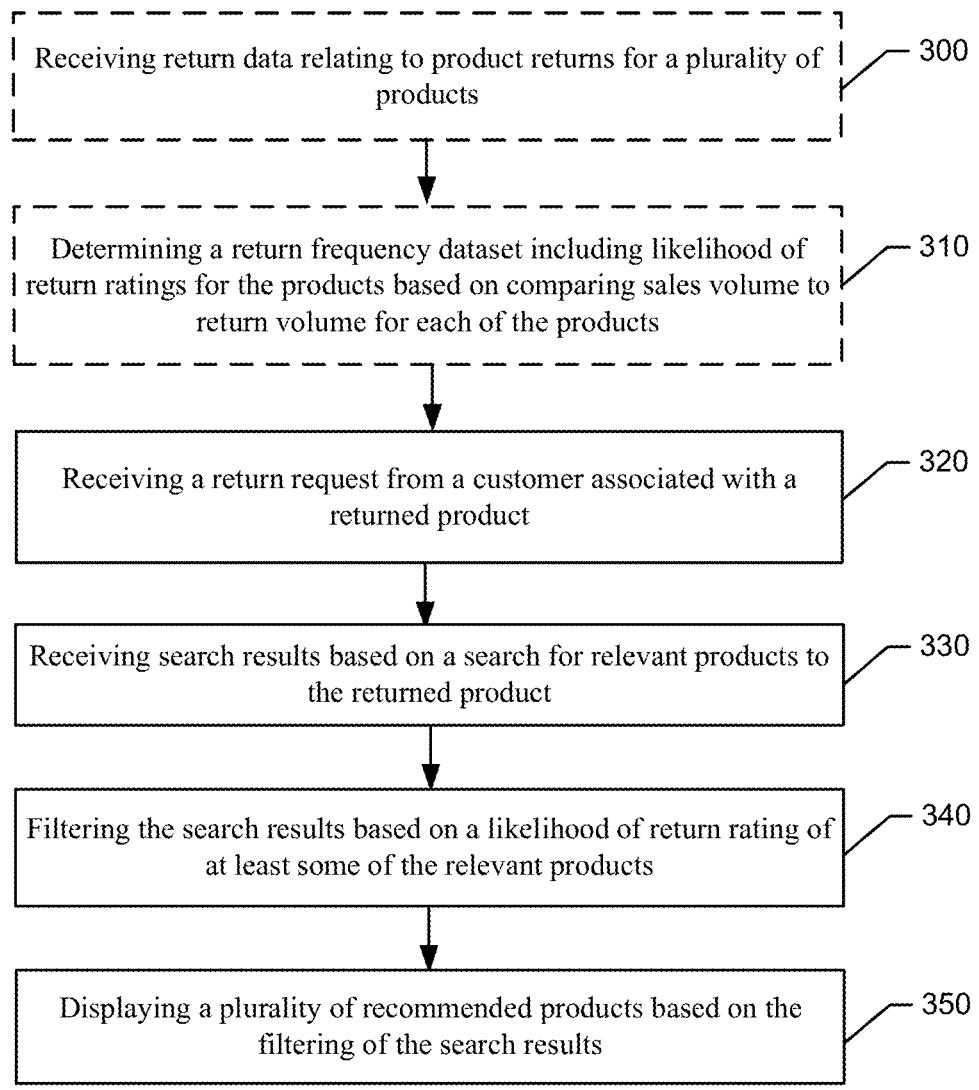
FIG. 4 illustrates a block diagram of a method of recommending products in association with product returns in accordance with an example embodiment.

From a technical perspective, the return processing platform 10, and more particularly the recommendation agent 44 and return processor 60, described above may be used to support some or all of the operations described above. As such, the apparatus described in FIG. 2 may be used to facilitate the implementation of several computer program and/or network communication based interactions. As an example, FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

FIG. 4 illustrates a block diagram of a method of recommending products in association with product returns in accordance with an example embodiment. The method may include receiving a return request from a customer associated with a returned product at operation 320 and receiving search results based on a search for relevant products to the returned product at operation 330. The method may further include filtering the search results based on a likelihood of return rating of at least some of the relevant products at operation 340, and displaying a plurality of recommended products based on the filtering of the search results at operation 350

In some embodiments, the method (and a corresponding apparatus or system configured to perform the operations of the method) may include (or be configured to perform) additional components/modules, optional operations, and/or the components/operations described above may be modified or augmented. Some examples of modifications, optional operations and augmentations are described below. It should be appreciated that the modifications, optional operations and augmentations may each be added alone, or they may be added cumulatively in any desirable combination. In this regard, for example, the method may further include optional initial operations including receiving return data relating to product returns for a plurality of products at operation 300 and determining a return frequency dataset including likelihood of return ratings for the products based on comparing sales volume to return volume for each of the products at operation 310. In an example embodiment, filtering the search results may include preventing display of a selected product from the search results responsive to the selected product having a corresponding likelihood of return rating below a threshold value, or preventing display of a selected product from the search results responsive a vendor tagging the selected product for exclusion from display for a particular product or user. In some cases, the returned product may be provided by a vendor, and the related products may be limited only to products offered by the vendor. In an example embodiment, displaying the plurality of recommended products may include displaying a modified price for each of the recommended products, where the modified price is determined as a regular price of each respective one of the recommended products minus a return value of the returned product. In some cases, displaying the plurality of recommended products may include displaying each product with an indication of the regular price, and an indication of the modified price proximate to each other, or displaying the plurality of recommended products on each of a plurality of separate points along a product return process flow path. In an example embodiment, a different group of products is displayed at each of the separate points. In some cases, filtering the search results may include removing any product previously returned by the customer from the search results.

In an example embodiment, an apparatus for performing the method of FIG. 4 above may comprise a processor (e.g., the processor 102) or processing circuitry configured to perform some or each of the operations (300-350) described above. The processor may, for example, be configured to perform the operations (300-350) by performing hardware implemented logical functions, executing stored instructions, or executing algorithms for performing each of the operations. In some embodiments, the processor or processing circuitry may be further configured for additional operations or optional modifications to operations 300 to 350.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An apparatus for recommending products in association with product returns, the apparatus comprising processing circuitry configured to:
   receive a return request from a customer associated with a returned product from a given merchant;
   receive search results based on a search for relevant products to the returned product;
   filter the search results based on a likelihood of return rating of at least some of the relevant products, the likelihood of return rating being determined based on a return model generated based on associations made with respect to return volume, return frequency and repurchase frequency associated with the given merchant, the customer and the returned product;
   modify ordering of the search results and apply exclusions to the search results;
   display a plurality of recommended products based on the modified ordering of the search results and the application of exclusions to the search results;
   receive feedback regarding performance of the return model and merchant applied tags associating products with exclusion and ordering adjustment instructions; and
   update the return model based on the feedback received and the merchant applied tags,
   wherein modifying ordering of the search results and applying exclusions to the search results comprises preventing display of at least one selected product from the search results responsive to one of the merchant applied tags identifying the at least one selected product for exclusion from display and adjusting an ordering of at least another selected product from the search results responsive to another of the merchant applied tags identifying the at least another selected product with a positive or negative association.

2. The apparatus of claim 1, wherein the processing circuitry is further configured to:
   receive return data relating to product returns for a plurality of products;
   determine a return frequency dataset including likelihood of return ratings for the products based on comparing sales volume to return volume for each of the products.

3. The apparatus of claim 1, wherein filtering the search results comprises preventing display of a selected product from the search results responsive to the selected product having a corresponding likelihood of return rating below a threshold value.

4. The apparatus of claim 1, wherein the returned product is provided by a vendor, and wherein the related products are limited only to products offered by the vendor.

5. The apparatus of claim 1, wherein displaying the plurality of recommended products comprises displaying a modified price for each of the recommended products, the modified price being a regular price of each respective one of the recommended products minus a return value of the returned product.

6. The apparatus of claim 5, wherein displaying the plurality of recommended products comprises displaying each product with an indication of the regular price, and an indication of the modified price proximate to each other.

7. The apparatus of claim 1,
   wherein displaying the plurality of recommended products comprises displaying the plurality of recommended products on each of a plurality of separate points along a product return process flow path.

8. The apparatus of claim 7, wherein a different group of products is displayed at each of the separate points.

9. The apparatus of claim 1, wherein filtering the search results further comprises removing any product previously returned by the customer from the search results.

10. The apparatus of claim 1, wherein updating the return model comprises updating the return model in real time.

11. A method of recommending products in association with product returns, the method comprising:
    receiving a return request from a customer associated with a returned product from a given merchant;
    receiving search results based on a search for relevant products to the returned product;
    filtering the search results based on a likelihood of return rating of at least some of the relevant products, the likelihood of return rating being determined based on a return model generated based on associations made with respect to return volume, return frequency and repurchase frequency associated with the given merchant, the customer and the returned product;
    modifying ordering of the search results and applying exclusions to the search results;
    displaying a plurality of recommended products based on the modified ordering of the search results and the application of exclusions to the search results;
    receiving feedback regarding performance of the return model and merchant applied tags associating products with exclusion and ordering adjustment instructions; and
    updating the return model based on the feedback received and the merchant applied tags,
    wherein displaying the plurality of recommended products comprises displaying the plurality of recommended products on each of a plurality of separate points along a product return process flow path, and
    wherein modifying ordering of the search results and applying exclusions to the search results comprises preventing display of at least one selected product from the search results responsive to one of the merchant applied tags identifying the at least one selected product for exclusion from display and adjusting an ordering of at least another selected product from the search results responsive to another of the merchant applied tags identifying the at least another selected product with a positive or negative association.

12. The method of claim 11, further comprising:
receiving return data relating to product returns for a plurality of products;
determining a return frequency dataset including likelihood of return ratings for the products based on comparing sales volume to return volume for each of the products.

13. The method of claim 11, wherein filtering the search results comprises preventing display of a selected product from the search results responsive to the selected product having a corresponding likelihood of return rating below a threshold value.

14. The method of claim 11, wherein the returned product is provided by a vendor, and wherein the related products are limited only to products offered by the vendor.

15. The method of claim 11, wherein displaying the plurality of recommended products comprises displaying a modified price for each of the recommended products, the modified price being a regular price of each respective one of the recommended products minus a return value of the returned product.

16. The method of claim 15, wherein displaying the plurality of recommended products comprises displaying each product with an indication of the regular price, and an indication of the modified price proximate to each other.

17. The method of claim 11, wherein a different group of products is displayed at each of the separate points.

18. The method of claim 11, wherein filtering the search results further comprises removing any product previously returned by the customer from the search results.

19. The method of claim 11, wherein updating the return model comprises updating the return model in real time.

* * * * *